(12) United States Patent
Walter et al.

(10) Patent No.: US 10,919,067 B2
(45) Date of Patent: Feb. 16, 2021

(54) ROTARY FEEDTHROUGH OF A GLUE VALVE UNIT

(71) Applicant: Focke & Co. (GmbH & Co. KG), Verden (DE)

(72) Inventors: Jan-Christian Walter, Hamburg (DE); Nils Neuhaus, Buxtehude (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 252 days.

(21) Appl. No.: 15/523,097

(22) PCT Filed: Dec. 7, 2015

(86) PCT No.: PCT/EP2015/002458
§ 371 (c)(1),
(2) Date: Apr. 28, 2017

(87) PCT Pub. No.: WO2016/102043
PCT Pub. Date: Jun. 30, 2016

(65) Prior Publication Data
US 2017/0361347 A1    Dec. 21, 2017

(30) Foreign Application Priority Data
Dec. 22, 2014    (DE) .................. 10 2014 018 969

(51) Int. Cl.
*B05B 15/40*    (2018.01)
*B05C 5/02*    (2006.01)
(Continued)

(52) U.S. Cl.
CPC ............ *B05B 15/40* (2018.02); *B05C 5/0279* (2013.01); *B05C 11/1034* (2013.01); *F16L 27/0828* (2013.01)

(58) Field of Classification Search
CPC .... B05B 15/40; F16L 27/0828; B05C 5/0279; B05C 11/1034
See application file for complete search history.

(56) References Cited

U.S. PATENT DOCUMENTS 2,655,391 A * 10/1953 Atkins ................ F16L 27/0832
277/529
3,960,187 A * 6/1976 Stock ......................... B01J 2/30
141/1
(Continued)

FOREIGN PATENT DOCUMENTS

CN    2369776 Y    3/2000
DE    1486802 A    5/1969
(Continued)

OTHER PUBLICATIONS

WIPO, International Search Report (on parent application), dated Feb. 10, 2016.
(Continued)

*Primary Examiner* — Angelisa L. Hicks
(74) *Attorney, Agent, or Firm* — Laurence P. Colton; Smith Tempel Blaha LLC

(57) ABSTRACT

A glue valve arrangement having a controllable, in particular electromagnetically operated metering member for the delivery of glue, having a main body with glue duct leading to the metering member, having a tubular glue line, with which glue originating from a separate glue source can be fed to the glue duct, having a rotary feedthrough, detachably fastened to the main body, for the articulated connection of the tubular glue line to the main body, and having a filter for the filtering of the glue. The invention is characterized in that the filter is assigned to the rotary feedthrough.

14 Claims, 4 Drawing Sheets

(51) Int. Cl.
  *B05C 11/10* (2006.01)
  *F16L 27/08* (2006.01)

(56) References Cited

U.S. PATENT DOCUMENTS

| | | | | |
|---|---|---|---|---|
| 4,263,140 A * | 4/1981 | Wujnovich | ............ | B01D 29/07 |
| | | | | 210/247 |
| 4,524,887 A | 6/1985 | Cocks | | |
| 4,962,871 A * | 10/1990 | Reeves | ................ | B05C 5/0225 |
| | | | | 222/504 |
| 7,387,681 B2 * | 6/2008 | Matsunaga | ............ | B05B 9/005 |
| | | | | 118/300 |
| 2004/0262824 A1 * | 12/2004 | Andersson | ................ | B05C 5/02 |
| | | | | 266/202 |
| 2005/0235909 A1 | 10/2005 | Jones | | |
| 2005/0236316 A1 | 10/2005 | Gould | | |
| 2008/0217360 A1 | 9/2008 | MacLean | | |
| 2009/0245926 A1 * | 10/2009 | Wei | ....................... | F16L 25/009 |
| | | | | 403/65 |
| 2013/0243598 A1 * | 9/2013 | Ziegler | ................ | F03D 7/0224 |
| | | | | 416/147 |
| 2013/0306679 A1 * | 11/2013 | Mercer | .................. | B05B 15/40 |
| | | | | 222/189.06 |

FOREIGN PATENT DOCUMENTS

| | | |
|---|---|---|
| DE | 2615111 A1 | 2/1977 |
| DE | 69730500 T2 | 1/2005 |
| DE | 102012016833 A1 | 5/2014 |
| DE | 102014001897 A1 | 8/2015 |
| EP | 1686218 A1 | 8/2006 |
| JP | 5062963 B2 | 10/2012 |
| WO | 2009045704 A2 | 4/2009 |

OTHER PUBLICATIONS

Deutsches Patent—und Markenamt (German Patent and Trademark Office), Recherchebericht (search in connection with a related application), Sep. 15, 2015.

State Intellectual Property Office of the People's Republic of China, Notification of the First Office Action (in a related application), dated Sep. 25, 2018.

State Intellectual Property Office of the People's Republic of China, Notification of the First Office Action (in a related application), dated May 5, 2019.

* cited by examiner

ROTARY FEEDTHROUGH OF A GLUE VALVE UNIT

STATEMENT OF RELATED APPLICATIONS

This application is the US National Phase of International Application No. PCT/EP2015/002458 having an International Filing Date of 7 Dec. 2015, which claims priority on German Patent Application No. 10 2014 018 969.4 having a filing date of 22 Dec. 2014.

BACKGROUND OF THE INVENTION

Technical Field

The present invention relates to a glue valve arrangement comprising a glue valve having a controllable, in particular electromagnetically operated metering member for the delivery of glue, in particular of hot glue, comprising a main body with glue duct leading to the metering member, comprising a separate tubular glue line, which runs in particular outside the main body and with which glue originating from a separate glue source can be fed to the glue duct, comprising a rotary feedthrough, fastened to the main body, for the articulated connection of the tubular glue line to the main body, and comprising a filter for the filtering of the glue. The invention further relates to a rotary feedthrough for a glue valve arrangement of this type.

Prior Art

Glue valve arrangements of this type, comprising controllable metering or closure members, or comprising one or more glue valves having such members, have long been known. In the cigarette industry, in particular, glue valve arrangements of this type are widely operated with hot glue. In this case, a wide variety of components of the glue valve arrangement are purposefully heated and kept at a defined temperature, in order to be able to guarantee the delivery of defined glue portion sizes throughout the operation. For the viscosity, and ultimately also the size of the respective glue portion which leaves the respective glue valve of the glue valve arrangement during the respective period of opening of the metering member, are dependent on the glue temperature. In order to prevent the metering member from being blocked by impurities in the glue, or the like, the glue is filtered through a filter which in the prior art is inserted in the main body of the glue valve arrangement or of the respective glue valve. In this context, it is inter alia disadvantageous that a changing of the filter is possible only in the liquid, hot state of the glue. For the worker entrusted with changing the filter, there is an acute risk of burning. In addition, appropriate bores must be made in the generally solid main body in order to be able to place the filter suitably in position. Not least, the filter has a certain spatial requirement which prevents the appropriate main bodies from being able to be built more compactly.

BRIEF SUMMARY OF THE INVENTION

The object of the present invention is to refine a glue valve arrangement of the type stated in the introduction, and a rotary feedthrough for this same.

This object is achieved by a glue valve arrangement comprising a controllable, in particular electromagnetically operated metering member for the delivery of glue, comprising a main body with glue duct leading to the metering member, comprising a tubular glue line, with which glue originating from a separate glue source can be fed to the glue duct, comprising a rotary feedthrough, detachably fastened to the main body, for the articulated connection of the tubular glue line to the main body, and comprising a filter for the filtering of the glue, characterized in that the filter is assigned to the rotary feedthrough (20).

According to the invention, the filter of the glue valve arrangement is no longer housed in the main body of the valve arrangement, but rather the filter is assigned to the rotary feedthrough, which is arranged largely outside the main body and which establishes the articulated connection of the tubular glue line to the main body. This articulated connection enables relative movements between these components, for instance for maintenance or assembly purposes. By no longer housing the filter in the main body, but rather assigning it to the rotary feedthrough, a significantly more compact design of the main body is enabled. Furthermore, the filter can be changed more easily, and more safely for the user. The bores in the main bodies, which are difficult to produce and are necessary in the prior art and into which the filters are placed, can also be dispensed with.

Preferredly, the filter of the rotary feedthrough is assigned to a filter receiving part of the rotary feedthrough, which filter receiving part is detachably connected—in particular via a screw joint—to the main body, and preferredly is screwed into a bore of this same, and is detachably connected to a pivot joint part, comprising a pivot joint, of the rotary feedthrough, preferably likewise via a screw joint. As a result of the detachable connection between filter receiving part and main body, on the one hand, and between filter receiving part and pivot joint part, on the other hand, a changing of the filter is particularly simple. For the entire filter receiving part can be straightforwardly replaced by a new filter receiving part with new filter.

In a further configuration of the filter receiving part, this possesses an in particular central glue duct for the passage of the glue. In this glue duct sits the filter, for instance extending transversely to this glue duct over the entire cross section of this same, so that the glue, during passage through the glue duct, must flow through the filter.

In a still further configuration of the filter receiving part or of the rotary feedthrough, the filter of the rotary feedthrough can be held in the glue duct by means of a pressing ring seated in an in particular central bore of the filter receiving part. Expediently, the central bore here preferredly forms the glue duct or is part thereof.

For the simple installation or removal of the rotary feedthrough, it can be provided that the filter receiving part possesses an external thread, which is screwed into a fitting internal thread of the pivot joint part.

As far as the pivot joint part of the rotary feedthrough is concerned, it can possess a first connector detachably connected to the filter receiving part, as well as a second connector rotatably mounted on the first connector.

Preferably, the second connector of the pivot joint part is here detachably connected to the tubular glue line, in particular by a screw joint to a glue line connector of the tubular glue line. Hence the first and the second connector are twistable relative to each other, whereby the relative movement between tubular glue line, on the one hand, and main body of the valve arrangement, on the other hand, is enabled. Ultimately, the rotatable mounting of the second connector on the first connector is then a constituent part of the pivot joint of the pivot joint part.

The pivot joint of the pivot joint part can in general possess just an individual (single-row) ball bearing. The relinquishment of a further, adjacent ball bearing enables a compact design. It can further be provided that the pivot joint possesses, in addition to the single-row ball bearing, also a slide bearing, in order to be able to reliably fully compensate all bending moments.

Preferably, also an individual single-row four-point ball bearing can be used in order to be able to safely dispense with an additional slide bearing. This variant enables a still more compact design.

The outer ring of one of the above-stated ball bearings is preferredly formed directly by the first connector, connected to the filter receiving part, of the pivot joint part, and the inner ring of this same by the second connector of the pivot joint part. For this purpose, appropriate circumferential recesses for the balls of the ball bearing can be made in the first connector or the second connector.

The second connector of the pivot joint part of the rotary feedthrough is preferredly of angled configuration or configured as an angle piece and possesses an in particular central glue duct, which extends up to an end piece, facing the filter receiving part, of the second connector, which end piece sits rotatably mounted in a central bore of the first connector. The other end piece of the second connector, which points in the direction of the tubular glue line, would accordingly run at an angle, in particular perpendicular, to the end piece facing the filter receiving part.

The aforementioned angularity of the second connector, or its configuration as an angle piece, then ensures the desired degree of freedom of the rotary feedthrough, or that the glue tube, together with the other end piece of the second connector, can be rotated or pivoted in a plane which runs at an angle, in particular perpendicular, to the rotational axis about which the end piece facing the filter receiving part—as a result of its rotatable mounting in the central bore of the first connector—can rotate.

Alternatively, it can also be provided, however, that the second connector is of straight or non-angular configuration. The two end pieces of the second connector would accordingly run not at an angle to each other, but along a common straight axis.

As far as the glue duct of the second connector is concerned, it preferredly opens out into the glue duct of the filter receiving part of the rotary feedthrough, wherein, for the (radial) sealing, that end piece of the second connector which embraces the appropriate glue duct end bears sealingly against one side of an elastic (ring) seal, and the filter receiving part, in particular the pressing ring of the filter receiving part, bears sealingly against the other side of the elastic seal.

In a further configuration of the invention, it is provided that to the filter receiving part of the rotary feedthrough is fastened an elastic (ring) seal, which, when the filter receiving part is fastened to the main body of the glue valve unit, ensures a glue-tight sealing between main body and filter receiving part.

The object of the present invention is also achieved by a rotary feedthrough for the articulated connection of a tubular glue line to a main body of a glue valve arrangement, characterized in that the rotary feedthrough possesses a filter for the filtering of glue flowing through the rotary feedthrough. Accordingly, such a rotary feedthrough has a filter for the filtering of the glue flowing through the rotary feedthrough. The further possible configuration of such a rotary feedthrough has already been comprehensively described above in connection with the whole of the glue valve arrangement.

BRIEF DESCRIPTION OF THE DRAWINGS

Further features of the present invention emerge from the appended patent claims, the following description of preferred illustrative embodiments of the invention, and from the appended drawings, in which:

DETAILED DESCRIPTION OF PREFERRED EMBODIMENTS

Figure 1:
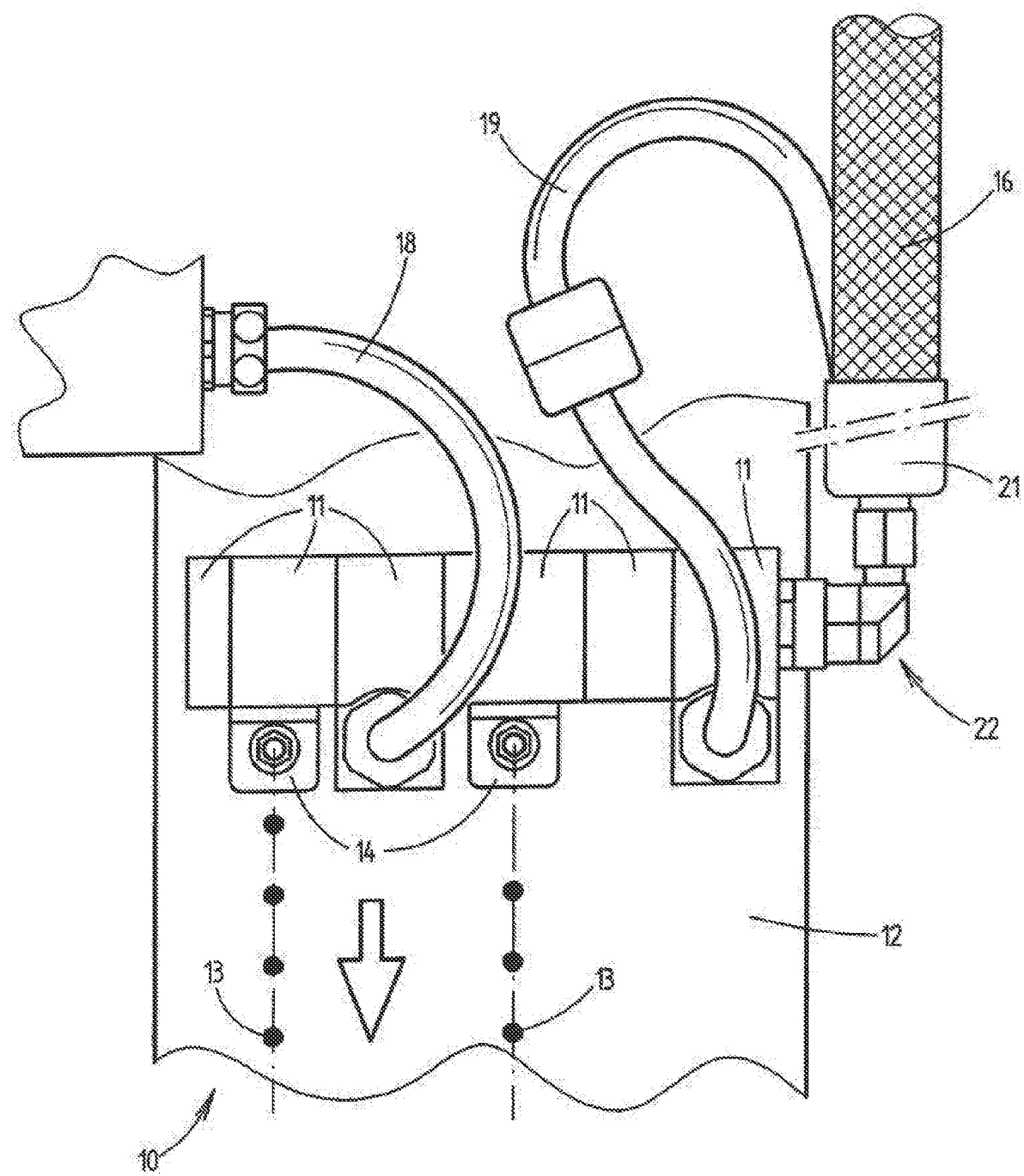
FIG. 1 shows a top view of a glue valve arrangement comprising a plurality of individual valves, along with rotary feedthrough and tubular glue line.

In FIG. 1, a glue valve arrangement 10 is represented schematically. It comprises in this case a plurality of individual modules 11. A plurality of, in the present case two of these modules 11 respectively possess a glue valve 14. A glue valve arrangement of this type is described in DE 10 2014 001 897.0, to the content of which reference is extensively made. According to the invention, the glue valve arrangement 10 can also, of course, be of non-modular configuration and comprise, for instance, only one glue valve.

As shown in the figures, the glue valve arrangement comprises 10 a glue valve 14 having a controllable, in particular electromagnetically operated metering member 44 for the delivery of glue, in particular of hot glue, comprising a main body 15 with glue duct 17 leading to the metering member 44, comprising a separate tubular glue line 16, which runs in particular outside the main body 15 and with which glue originating from a separate glue source can be fed to the glue duct 17, comprising a rotary feedthrough 20, fastened to the main body 15, for the articulated connection of the tubular glue line 16 to the main body 15, and comprising a filter 34 for the filtering of the glue.

In preferred embodiments of the invention the glue valve arrangement 10 comprises a controllable, in particular electromagnetically operated metering member 44 for the delivery of glue, comprising a main body 15 with glue duct 17 leading to the metering member 44, comprising a tubular glue line 16, with which glue originating from a separate glue source can be fed to the glue duct 17, comprising a rotary feedthrough 20, detachably fastened to the main body 15, for the articulated connection of the tubular glue line 16 to the main body 15, and comprising a filter 34 for the filtering of the glue, characterized in that the filter 34 is assigned to the rotary feedthrough 20.

In the shown illustrative embodiment, the valve arrangement 10 serves to apply glue, namely, in the present case, hot glue, to surfaces of blanks used in the manufacture of cigarette packs and made of paper, foil or the like.

With the glue valves 14 of the valve arrangement 10, respectively individual (small) glue portions are applied to the respective blank 12. Normally, for this purpose, the respective blank 12 is moved relative to the valve arrangement 10, in particular transversely to the longitudinal extent of this same. In this way, the valve arrangement 10 can be fixedly positioned, for instance, in a horizontal plane, and the blanks 12 to be provided with the glue are conveyed, in a horizontal plane parallel thereto beneath the valve arrangement 10, along under this same (arrow direction in FIG. 1). Accordingly, individual parallel glue traces, which are spaced apart perpendicular to the direction of feed of the respective blank 12 or in the direction of the longitudinal extent of the valve arrangement 10, are respectively formed from respectively individual glue portions 13.

The individual modules 11 are arranged, in the longitudinal extent of the valve arrangement 10, consecutively in a common line. They are in part differently constructed or have different functions. Two of the individual modules shown in FIG. 1 respectively have a glue valve 14, with metering opening (not shown) integrated in this same and with appropriate controllable metering member (44 in FIG. 4).

The glue valves 14 are known per se and can be actuated, for instance, electromagnetically.

During operation, the metering member 44 is moved to and fro, in particular cyclically, between an opening position, in which glue can pass out of the glue valve 14, and a closing position, in which the glue cannot pass out.

The opening force necessary for an opening movement can be generated, for instance in known manner against the resistance of a return member, by the magnetic force of a controllable electromagnet. After the magnetic field has been switched off or, in general, after the opening or magnetic force has been sufficiently reduced, the closing force necessary for a closing movement can be applied by the return member, for instance by a spring or by mutually repelling permanent magnets.

An appropriate electronic control system, to which the respective glue valve 14 is connected, then ensures the necessary impulses for the opening and closing of the glue valve 14.

Each of the individual modules 11 possesses a, in the present case, substantially solid main body 15. However, such a main body can also be configured in the manner of a housing, for instance.

In the main body 15 respectively runs at least one glue duct, or the individual glue ducts of the main body 15 are connected to one another such that hot glue, which is fed to the valve arrangement 10 via a tubular, flexible glue line/tube 16 running outside the main body 15, can respectively be conducted to the individual glue valves 14, and within these same to the individual metering members of the glue valves 14.

In FIG. 1 is additionally shown a tube 18 of the valve arrangement 10, in the inside of which run leads which extend from the electronic control system for the individual modules 11 or glue valves 14 toward the modules 11.

In a further tube 19 of the valve arrangement 10 run power supply lines, which originate from an appropriate voltage supply source and which end at heating members which are disposed in the main bodies 15 and which serve to heat the main bodies 15 and, in particular, the glue valves 14.

Particularly important is now a rotary feedthrough 20 of the valve arrangement 10, via which the heated glue line 16 is articulately, namely rotatably, connected to the main body 15—in the present case of an, in FIG. 1, outer—individual module 11.

The rotary feedthrough 20 is on the one hand detachably connected to the main body 15, on the other hand detachably connected to a connector 21 connected to the glue line 16.

The rotary feedthrough 20 is here arranged, in a glue-conducting manner, between the glue line 16 and the main body 15. In other words, the glue flows out of the glue line 16 through the rotary feedthrough 20 to the main body 15.

The rotary feedthrough 20 is configured such that the glue line 16 can be pivoted relative to the main body 15, in the present case in a plane running parallel to that outer side of the main body 15 to which the rotary feedthrough 20 is fastened. Of course, other rotatation or pivot planes can also be provided.

The rotary feedthrough 20 possesses a central glue duct 22, which opens out into the glue duct 17 (shown in FIG. 2) of the main body 15. The glue fed via the glue duct 17 is distributed inside the individual modules 11, in particular in the appropriate main bodies 15, to the individual glue valves 14, if need be via further connecting glue ducts.

The glue duct 22 of the rotary feedthrough 20 is composed of individual part-sections 22.1 and 22.2.

The glue duct section 22.1 runs within a pivot joint part 23 of the rotary feedthrough 20.

The pivot joint part 23 is in the present case composed of a first connector 24 and a second connector 25.

The second connector 25 of the pivot joint part 23 of the rotary feedthrough 20 is at one end, namely at a first end piece 26 facing the glue line 16, detachably connected to, in the present case screwed to, the connector 21 of the glue line 16.

The other end of the second connector 25, namely a second end piece 27 of this same, runs at an angle, in the present case perpendicular, to the first end piece 26.

Furthermore, the second end piece 27 is mounted rotatably on the first connector 24. More specifically, it engages in a central bore 40 of the first connector 24 and is there, in the embodiment shown in FIG. 2, rotatably mounted by means of a single-row ball bearing 29 as well as a slide bearing 30.

The radial inner side of the first connector 24 and the radial outer side of the second connector 25, more specifically of the second end piece 27 of the second connector 25, here form the outer ring 42 or the inner ring 43 of the ball bearing 29. To put it more precisely, appropriate annular recesses are recessed into the appropriate faces of the first connector 24 or of the second connector 25.

The ball bearing 29 and the slide bearing 30 form together with the first connector 24 and the second connector 25, or the second end piece 27 of the second connector 25, ultimately a pivot joint 31 of the pivot joint part 23.

Detachably connected to the pivot joint part 23, more specifically to the first connector 24, is a filter receiving part 32 of the rotary feedthrough 20. In the present case, the filter receiving part 32 is detachably screwed to the pivot joint part 23 or the first connector 24.

The filter receiving part 32 possesses a central bore 33, which ultimately forms the further glue duct section 22.2 of the rotary feedthrough 20. The glue duct section 22.1 here opens out, in the direction of flow of the glue, into the glue duct section 22.2. The bore 33 of the filter receiving part 32 widens in the direction of that end of the filter receiving part 32e which is connected to the pivot joint part 23.

In the bore 33, in the present case in a widened section thereof which forms a receiving region 35 of the filter receiving part 32, is arranged a filter 34, which is known per se, for the filtering of the glue flowing through said filter.

The filter 34 extends transversely to the bore 33 or to the glue duct section 22.2. The receiving region 35 is in the present case of (hollow-)cylindrical configuration. The filter 34 extends over the whole of the cross section of the glue duct section 22.2.

The filter 34 is held in its position by a pressing ring 36, which is pressed into the receiving region 35 with an interference fit.

For the sealing between the second end piece 27 of the second connector 25 of the pivot joint part 23, on the one hand, and the filter receiving part 32. on the other hand, a seal 37 is provided, in the present case an elastic ring seal. Bearing sealingly against the ring seal 37 is, on the one hand, a free end face of the second end piece 27 and, on the other hand, a free end face of the pressing ring 36.

On the side facing the main body 15, the filter receiving part 32 is connected to this main body 15 by means of a screw joint. In the present case, an end piece 41 of the filter receiving part 32 is screwed into a fitting threaded bore in the main body 15.

For the sealing between the filter receiving part 32 and the main body 15, an elastic (ring) seal 38 is arranged between these components. The seal 38 is here fastened to the filter receiving part 32.

The shown design of the rotary feedthrough 20 with components detachably connected to each other, in particular the filter receiving part 32, with filter 34, detachably connected to the main body 15, on the one hand, and the pivot joint part 23, on the other hand, offers inter alia the particular advantage of being able to exchange the filter 34 easily whenever required.

In this event, the entire filter receiving part 32, with filter 34 accordingly in need of exchange, can be straightforwardly replaced by a new filter receiving part 32 with new filter 34. For this, only the connection or screw joint between the filter receiving part 32 and the main body 15 must be released, as well as the connection between the filter receiving part 32 and the pivot joint part 23. After this, the new filter receiving part 32 can then be connected or screwed to the aforementioned components.

Figure 3:
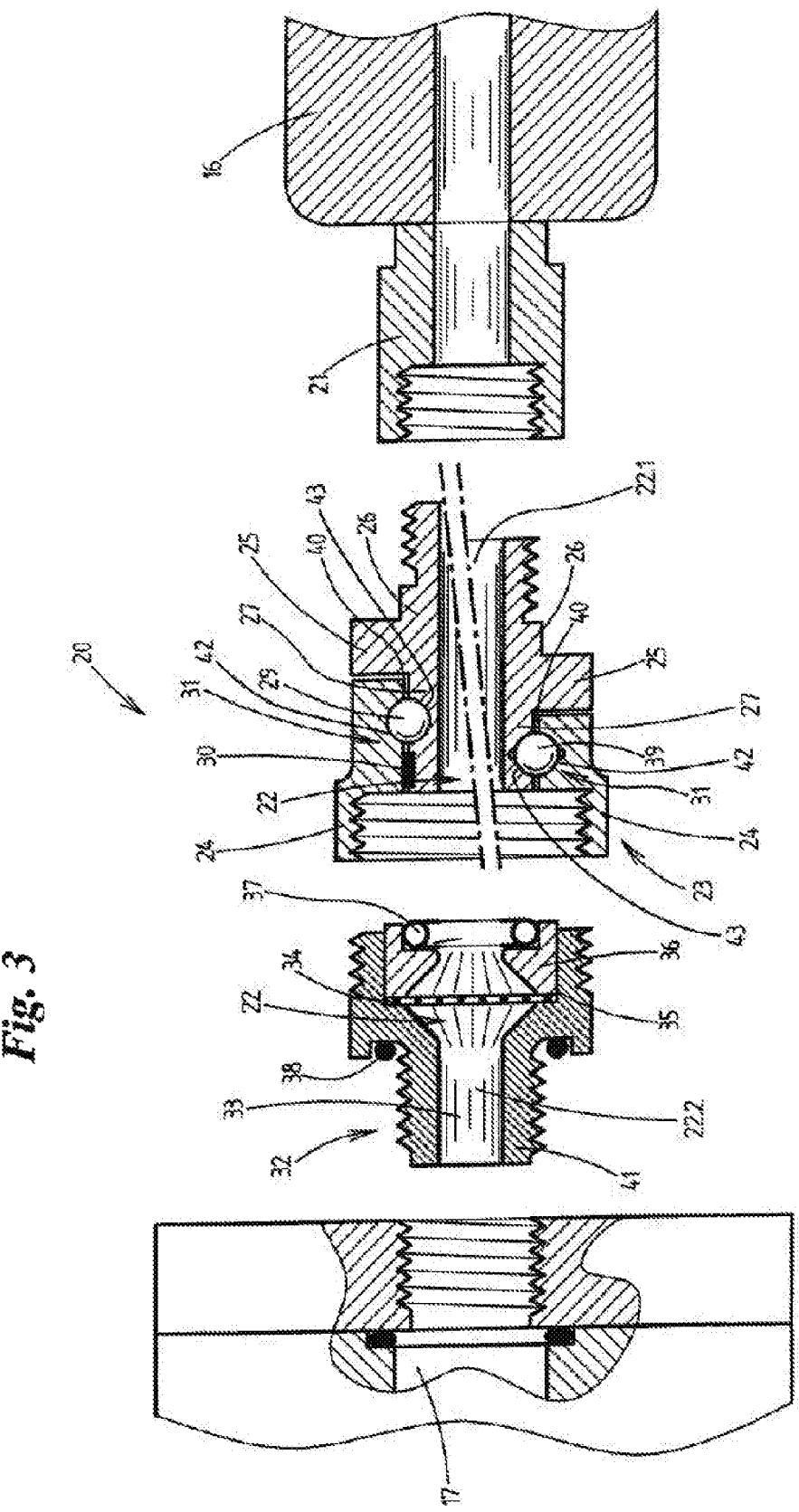
FIG. 3 shows a cross section, analogous to FIG. 2, through an embodiment of the rotary feedthrough, yet with rotary feedthrough dismantled into two individual components, namely into a filter receiving part and into a pivot joint part.

In FIG. 3, the removability of the aforementioned components is indicated on the basis of a rotary feedthrough 20 comprising two alternative embodiments of the pivot joint part 23.

Figure 2:
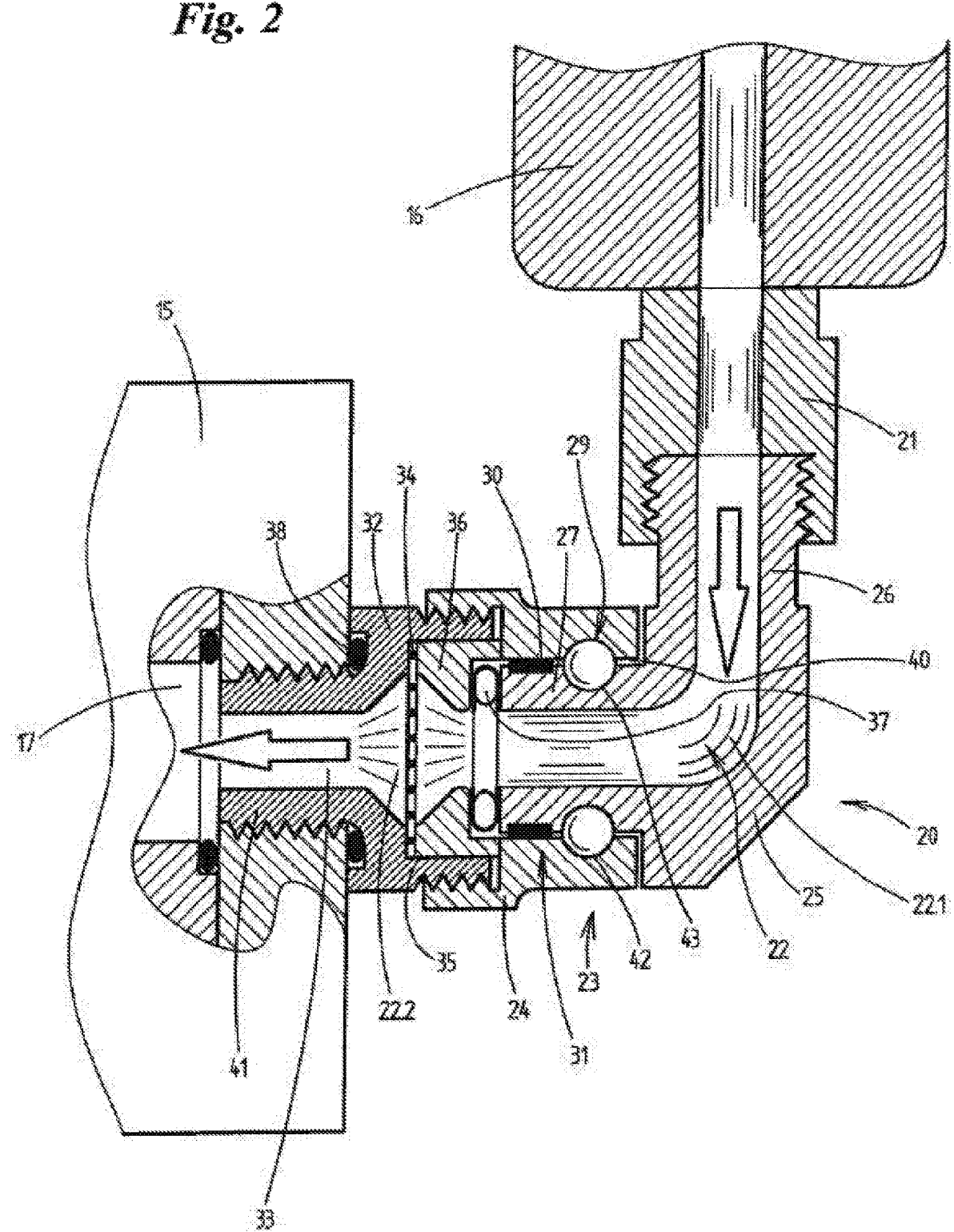
FIG. 2 shows a cross section through the rotary feedthrough of the glue valve arrangement from FIG. 1 in operation-ready, assembled state.

Both alternatives of the pivot joint part 23 of FIG. 3, visually separated from each other by a dash-dot double line, differ from the pivot joint part 23 of FIG. 2 on the one hand by virtue of the fact that, in the pivot joint part 23 of FIG. 3, the second connector 25 is not configured as an angle piece, but as a straight component configured, in particular, symmetrically to a longitudinal center axis.

Hence, the first and the second end piece 26, 27 of the second connector 25 are arranged one behind the other along a common straight line axis. For this reason, the rotational axis about which the tubular glue line 16 can be rotated by the rotatable mounting of the second connector 25 on the first connector 24 coincides with the rotational axis about which the end piece 27 of the second connector 25 can be rotated.

That embodiment of the pivot joint part 23 which is represented beneath the dash-dot double line differs from the solution from FIG. 2, moreover, by virtue of the fact that, instead of the ball bearing 29 and the slide bearing 30, a four-point ball bearing 39 is used.

Through the use of the four-point ball bearing 39, the first connector 24, and consequently also the second connector 25, can be built shorter, while at the same time maintaining the required absorption of the bending moments, since the rotary mounting, by virtue of just a single four-point ball bearing, occupies less space than the rotary mounting using a combination of normal single-row ball bearing and slide bearing.

Of course, the four-point ball bearing can also be used in the embodiment of the pivot joint part 23 of FIG. 2.

Figure 4:
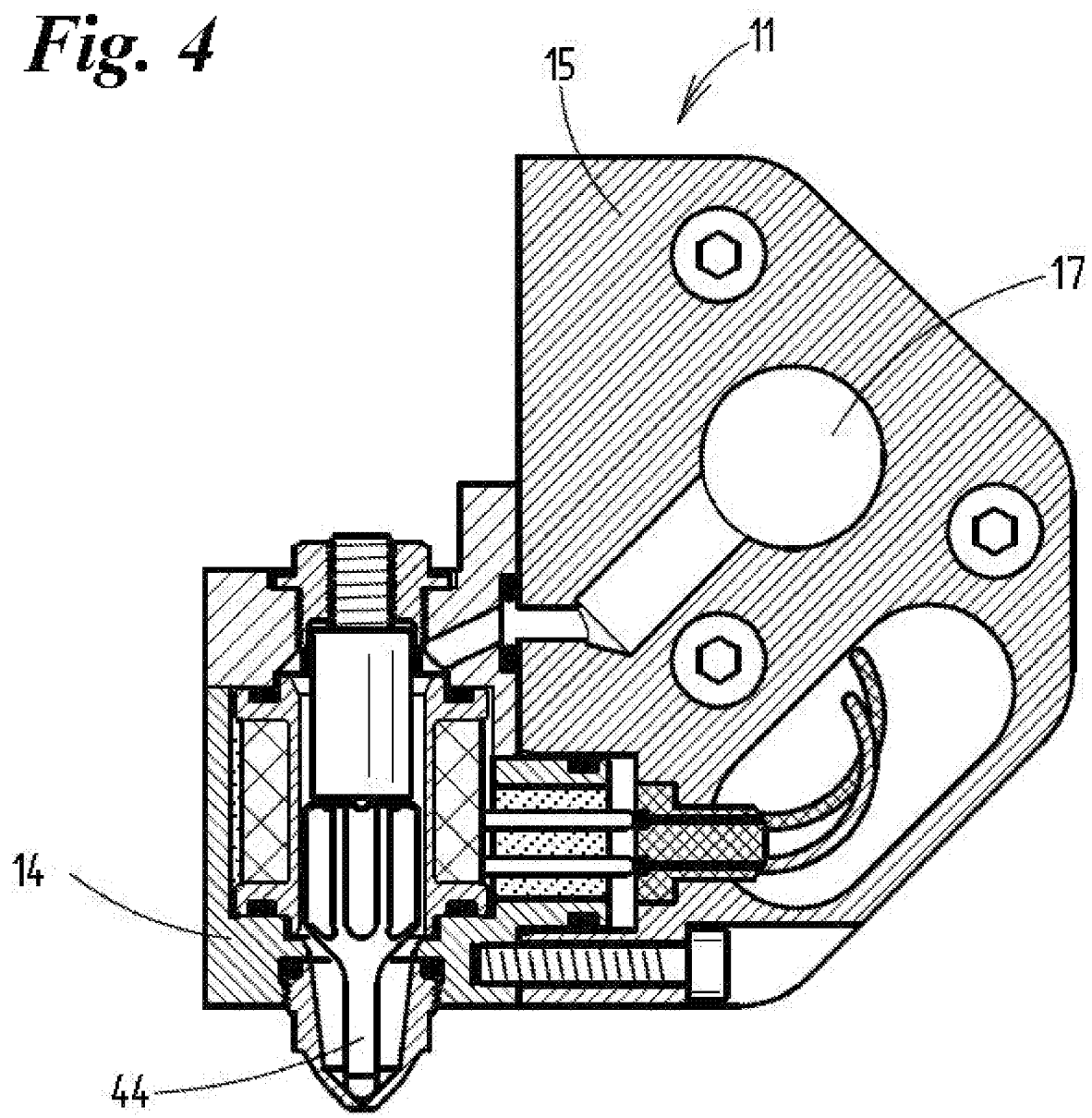
FIG. 4 shows a cross section of an individual module from FIGS. 1-3 showing the placement of a metering member.

In FIG. 4, a cross section of an individual module from FIGS. 1-3 showing the placement of a metering member 44 is represented. A glue valve arrangement comprising an individual module having such a metering member 44 is described in DE 10 2014 001 897.0, the metering member 44 being known to one of ordinary skill in the art.

REFERENCE SYMBOL LIST 10 glue valve arrangement
11 individual module
12 blank
13 glue portion
14 valve unit
15 main body
16 glue line
17 glue duct
18 tube
19 tube
20 rotary feedthrough
21 connector
22 glue duct
22.1 part-section
22.2 part-section
23 pivot joint part
24 first connector
25 second connector
26 first end piece
27 second end piece
29 ball bearing
30 slide bearing
31 pivot joint
32 filter receiving part
33 bore
34 filter
35 receiving region
36 pressing ring
37 seal
38 (ring) seal
39 four-point ball bearing
40 bore
41 end piece
42 outer ring
43 inner ring
44 metering member

The invention claimed is:

1. A glue valve arrangement comprising:
a controllable metering member for the delivery of glue;
a main body with a glue duct leading to the metering member;
a tubular glue line, with which glue is fed to the glue duct;
a rotary feedthrough, detachably connected to the main body, for the articulated connection of the tubular glue line to the main body; and
a filter for the filtering of the glue,
wherein the filter is assigned to a filter receiving part of the rotary feedthrough, the filter receiving part being detachably connected to the main body, and is screwed into a bore of the main body, and is detachably connected to a pivot joint part, comprising a pivot joint, of the rotary feedthrough,
wherein the filter sits in a central bore of the filter receiving part and extends transversely to the central bore or to a glue duct for the passage of glue formed by the central bore, wherein the filter is held in the glue duct by means of a pressing ring seated in the central bore of the filter receiving part, wherein the pivot joint part of the rotary feedthrough comprises a first connector detachably connected to the filter receiving part, and a second connector rotatably mounted on the first connector, wherein the second connector of the pivot joint part is of an angled configuration and comprises a central glue duct, which extends up to the free end of an end piece, facing the filter receiving part, of the second connector, which end piece sits rotatably mounted in a central bore of the first connector, and wherein the glue duct of the second connector opens out into the glue duct of the filter receiving part, wherein, for radial sealing, the end piece of the second connector which encompasses the glue duct end of the second connector bears sealingly against one side of an elastic ring seal, and the pressing ring of the filter receiving part bears sealingly against another other side of the elastic ring seal.

2. The glue valve arrangement as claimed in claim 1, wherein the filter receiving part comprises an external thread, which is screwed into an internal thread of the pivot joint part.

3. The glue valve arrangement as claimed in claim 1, wherein the second connector of the pivot joint part of the rotary feedthrough is detachably connected to the tubular glue line.

4. The glue valve arrangement as claimed in claim 3, wherein the second connector is detachably connected by a screw joint to a glue line connector of the tubular glue line.

5. The glue valve arrangement as claimed in claim 1, wherein the pivot joint of the pivot joint part comprises just one single-row ball bearing.

6. The glue valve arrangement as claimed in claim 5, wherein the pivot joint comprises, in addition to the single-row ball bearing, a slide bearing.

7. The glue valve arrangement as claimed in claim 5, wherein an outer ring of the single row ball bearing is formed by the first connector, connected to the filter receiving part, of the pivot joint part, and an inner ring of the single row ball bearing is formed by the second connector of the pivot joint part.

8. The glue valve arrangement as claimed in claim 5, wherein the ball bearing is a single-row four-point ball bearing.

9. The glue valve arrangement as claimed in claim 1, wherein the elastic ring seal is fastened to the filter receiving part, which, when the filter receiving part is fastened to the main body, ensures a glue-tight sealing between the main body and the filter receiving part.

10. The glue valve arrangement as claimed in claim 1, wherein the metering member is electromagnetically operated.

11. The glue valve arrangement as claimed in claim 1, wherein the filter receiving part is detachably connected to the pivot joint part via a screw joint.

12. A rotary feedthrough for the articulated connection of a tubular glue line to a main body of a glue valve arrangement, wherein the rotary feedthrough comprises a filter for the filtering of glue flowing through the rotary feedthrough, wherein the filter is assigned to a filter receiving part of the rotary feedthrough, which filter receiving part is detachably connected to the main body of the glue valve arrangement, and is screwable into a bore of the main body, and is detachably connected to a pivot joint part, comprising a pivot joint, of the rotary feedthrough, wherein the filter sits in a central bore of the filter receiving part and extends transversely to the central bore or to a glue duct for the passage of glue formed by the central bore, wherein the filter is held in the glue duct by means of a pressing ring seated in the central bore of the filter receiving part, wherein the pivot joint part of the rotary feedthrough comprises a first connector detachably connected to the filter receiving part, and a second connector rotatably mounted on the first connector, wherein the second connector of the pivot joint part is of an angled configuration and comprises a central glue duct, which extends up to the free end of an end piece, facing the filter receiving part, of the second connector, which end piece sits rotatably mounted in a central bore of the first connector, and wherein the glue duct of the second connector opens out into the glue duct of the filter receiving part, wherein, for radial sealing, the end piece of the second connector which encompasses the glue duct end of the second connector bears sealingly against one side of an elastic ring seal, and the pressing ring of the filter receiving part bears sealingly against another side of the elastic ring seal.

13. The rotary feedthrough as claimed in claim 12, wherein the glue valve arrangement comprises:
a controllable metering member for the delivery of glue;
a main body with a glue duct leading to the metering member; and
a tubular glue line, with which glue is fed to the glue duct leading to the metering member.

14. The rotary feedthrough as claimed in claim 12, wherein the filter receiving part is detachably connected to the pivot joint part via a screw joint.

* * * * *